United States Patent [19]

Sandstrom

[11] Patent Number: 5,736,593
[45] Date of Patent: Apr. 7, 1998

[54] TERNARY BLEND OF POLYISOPRENE, EPOXIDIZED NATURAL RUBBER AND CHLOROSULFONATED POLYETHYLENE

[75] Inventor: Paul Harry Sandstrom, Tallmadge, Ohio

[73] Assignee: The Goodyear Tire & Rubber Company, Akron, Ohio

[21] Appl. No.: 787,804

[22] Filed: Jan. 23, 1997

[51] Int. Cl.$^6$ .............................. C08L 9/00; C08L 15/00; C08K 3/36; C08K 5/36

[52] U.S. Cl. .................... 523/437; 152/209 R; 523/435; 523/438; 525/101; 525/236; 525/240; 525/332.6; 525/333.1

[58] Field of Search ................ 152/209 R; 523/437, 523/438, 435; 525/101, 236, 240, 332.6, 333.1

[56] References Cited

U.S. PATENT DOCUMENTS 5,396,940  3/1995  Segatta et al. .................... 152/209 R

OTHER PUBLICATIONS

Chemical Abstracts 113:173864, "Self-vulcanized Rubber Blend System Based on Epoxidized Natural Rubber and Chlorosulfonated Polyethylene" 1990.

*Primary Examiner*—Frederick Krass
*Attorney, Agent, or Firm*—Bruce J. Hendricks

[57] ABSTRACT

The present invention relates to a ternary polymer blend particularly suited for use in tire treads and carcass ply compounds. The ternary blend is composed of, based on 100 parts by weight of the ternary polymer blend, from about 76 to 94 parts by weight of polyisoprene; 3 to 12 parts by weight of epoxidized natural rubber; from about 3 to 12 parts of chlorosulfonated polyethylene.

11 Claims, No Drawings

TERNARY BLEND OF POLYISOPRENE, EPOXIDIZED NATURAL RUBBER AND CHLOROSULFONATED POLYETHYLENE

FIELD

This invention relates to a ternary blend of polymers. In a more specific embodiment, the ternary blend is comprised of polyisoprene, an epoxidized natural rubber and chlorosulfonated polyethylene.

BACKGROUND OF THE INVENTION

Pneumatic rubber tires are conventionally prepared with a rubber tread which can be a blend of various rubbers. The rubbers are evaluated, selected and blended for a purpose of achieving desired tire tread properties and particularly a balance of tire tread characteristic properties, mainly, rolling resistance, low strain modulus, traction and wear.

U.S. Pat. No. 5,396,940 discloses a sulfur-cured rubber composition containing 15 to 30 parts by weight of epoxidized natural rubber and 70 to 85 parts by weight of cis-1,4-polyisoprene rubber.

U.S. Pat. No. 5,118,546 discloses blends of 25 to 75 percent by weight polychloroprene and from about 75 to about 25 percent by weight epoxidized natural rubber.

U.S. Pat. Nos. 3,857,775 and 4,087,343 discloses an electrolytic cell including a flexible sheet cover. The sheet is comprised of a vulcanized blend of a first vulcanized rubbery polymer and a second vulcanized rubbery polymer. The first polymer is preferably polyisoprene and the second polymer may be halogenated butyl rubber, EPDM, a copolymer of butadiene and acrylonitrile, a copolymer of butadiene and styrene or chlorosulfonated polyethylene.

SUMMARY OF THE INVENTION

The present invention relates to a ternary polymer blend particularly suited for use as a composition in a pneumatic tire, such as a tread. The ternary blend is composed of, based on 100 parts by weight of the ternary polymer blend, an intimate mixture of from 60 to 98 parts by weight of polyisoprene, 1 to 15 parts by weight of epoxidized natural rubber; and 1 to 15 parts by weight of chlorosulfonated polyethylene.

DETAILED DESCRIPTION OF THE INVENTION

In accordance with another embodiment of the present invention, there is disclosed a pneumatic tire having a rubber component which is a sulfur-cured composition composed of, based on 100 parts by weight of a ternary polymer blend an intimate mixture of from 76 to 94 parts by weight of polyisoprene, 3 to 12 parts by weight of a epoxidized natural rubber; and 3 to 12 parts by weight of a chlorosulfonated polyethylene.

The first component of the ternary polymer blend of the present invention is polyisoprene. The polyisoprene may be natural rubber or synthetic rubbers of a cis-1,4 polymer of isoprene, which may contain up to 15 percent of the trans-1,4 structure. The natural rubber may be any of the well-known types such as pale crepe, smoke sheet or balata. The polyisoprene will comprise from about 76 to 94 percent by weight of the ternary blend. Preferably, the polyisoprene will comprise from 80 to 90 percent by weight of the ternary blend.

The second component of the ternary polymer blend is an epoxidized natural rubber. As known to those skilled in the art, epoxidized natural rubber is a modified form of natural rubber in which some of the unsaturation is replaced by epoxidized groups. Epoxidized natural rubber which may be used in the present invention may have a level of epoxidized modification ranging from about 15 to 85 mole percent. Preferably, the epoxidized level will be in the range of from about 20 to 50 percent. A particularly preferred epoxidized level is 25 percent. As known to those skilled in the art, epoxidized natural rubber can be obtained by epoxidizing natural rubber latex. This material is commercially available from Malaysian rubber producers under the designation ENR 50 and ENR 25 in the form of dehydrated bales. The epoxidized rubber comprises from 3 to 12 parts by weight of the ternary polymer blend. Preferably, the epoxidized natural rubber comprises from 5 to 10 parts by weight of the ternary polymer blend.

The third essential component in the ternary polymer blend of the present invention is chlorosulfonated polyethylene. The chlorosulfonated polyethylenes which can be used in the present invention are solid polymers and are well known in the art. They possess a chlorine content of 10 to 50 percent, preferably 25 to 50 percent, more preferably 25 to 30 percent and most preferably 28 to 30 percent. They can be prepared by the chlorination of polyethylene and reacting the polymer with the sulfur dioxide to introduce sulfonyl chloride groups. These polymers are described in U.S. Pat. Nos. 2,212,786; 2,586,363; 2,646,422; 2,862,917; 2,879,261; 2,972,604; and 2,982,759. The sulfur content of the polymers due to the sulfonyl groups is from 0.40 to 3.0 percent, preferably 0.70 to 3.0 percent and most preferably 1.0 to 1.5 percent. A typical polymer has a molecular weight of about 20,000; a specific gravity of about 1.11 to 1.28 and a raw polymer viscosity of 30 to 66 (ML-4 at 100° C.). The chlorosulfonated polyethylene comprises from 3 to 12 parts by weight of the ternary polymer blend. Preferably, the chlorosulfonated polyethylene comprises from 5 to 10 parts by weight of the ternary polymer blend.

The ternary polymer blend of the present invention may optionally contain a siliceous pigment (alternatively referred to herein as silica filler). The silica filler that can be used include both pyrogenic and precipitated finely-divided silicas of the type heretofore employed for rubber compounding. The silica filler, however, is preferably of the type obtained by precipitation from a soluble silicate, such as sodium silicate. For example, silica fillers produced according to the method described in U.S. Pat. No. 2,940,830 can be used. These precipitated, hydrated silica pigments have a $SiO_2$ content of at least 50 percent and usually greater than 80 percent by weight on anhydrous basis. The silica filler may have an ultimate particle size in the range of from about 50 to 10,000 angstroms, preferably between 50 and 400 and, more preferably, between 100 and 300 angstroms. The silica may be expected to have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, usually 50 to 300 square meters per gram. The BET method of measuring surface area is described in the *Journal of the American Chemical Society*, Vol. 60, page 304 (1930). The silica also has a dibutyl phthalate (DBP) absorption value in a range of about 200 to about 400, with a range of from about 220 to 300 being preferred.

Various commercially available silicas may be considered for use in this invention such as, for example only and with limitation, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

The amount of silica filler used as the reinforcing filler can vary widely. Generally speaking, the amount may range between about 5 and about 85 parts by weight of siliceous pigment per 100 parts by weight of total rubber are used. More typically, between about 10 and 50 parts by weight of siliceous pigment per 100 parts of rubber are used.

If a silica is used in the ternary polymer blend, the blend will then generally contain a silica coupling agent. Such coupling agents, for example, may be premixed, or pre-reacted, with the silica particles or added to the rubber mix during the rubber/silica processing, or mixing, stage. If the coupling agent and silica are added separately to the ternary rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur-vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur-vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during initial rubber/silica/coupler mixing stages and, thus, prior to a subsequent vulcanization stage.

The rubber-reactive group component of the coupler may be, for example, one or more of groups such as mercapto, amino, vinyl, epoxy and sulfur groups, preferably a sulfur or mercapto moiety and more preferably sulfur.

A representative coupling agent may be, for example, a bifunctional sulfur containing organosilane such as, for example, bis-(3-triethoxysilylpropyl)tetrasulfide, bis-(3-trimethoxysilylpropyl)tetrasulfide and bis(3-triethoxysilylpropyl)tetrasulfide grafted silica from DeGussa, A. G. If used, the amount of silica coupling agent may range from about 0.5 to about 8.5 parts by weight per 100 parts by weight of the ternary polymer blend used. Preferably, if used, the amount of silica coupler ranges from about 1.0 to about 5.0 parts by weight per 100 parts by weight of the ternary polymer blend used.

In addition to the four components mentioned above, the ternary polymer blend may contain conventional additives including reinforcing agents, fillers, peptizing agents, pigments, stearic acid, accelerators, sulfur-vulcanizing agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 100 parts by weight based on 100 parts by weight of the ternary polymer blend (phb). Preferably, carbon black is used in amounts ranging from about 15 to 85 phb. Typical carbon blacks that are used include N110, N121, N220, N231, N234, N242, N293, N299, N326, N330, M332, N339, N343, N347, N351, N358, N375, N472, N539, N550, N660, N683, N754, and N765. Depending on the particular use of the compound, the appropriate carbon black may be selected. Representative of conventional accelerators are amines, guanidines, thioureas, thiols, thiurams, sulfenamides, dithiocarbamates and xanthates which are typically added in amounts of from about 0.2 to about 5 phb. Representative of sulfur-vulcanizing agents include element sulfur (free sulfur) or sulfur-donating vulcanizing agents, for example, an amine disulfide, polymeric polysulfide or sulfur olefin adducts. The amount of sulfur-vulcanizing agent will vary depending on the weight percentage of rubber and particular type of sulfur-vulcanizing agent but generally range from about 0.1 phr to about 5 phr (parts by weight per 100 parts by weight of total rubber) with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phb to about 10 phb with a range of from about 2 to 6 phb being preferred. Representative of a peptizing agent that may be used is pentachlorophenol which may be used in an amount ranging from about 0.1 phb to 0.4 phb with a range of from about 0.2 to 0.3 phb being preferred. Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in a conventional amount ranging from about 0 to about 50 phb with a range of from about 5 to 35 phb being preferred. Representative of an initiator that may be used is stearic acid. Initiators are generally used in a conventional amount ranging from about 1 to 4 phb with a range of from about 2 to 3 phb being preferred.

Accelerators may be used in a conventional amount. In cases where only a primary accelerator is used, the amounts range from about 0.5 to 4.0 phb. In cases where combinations of two or more accelerators are used, the primary accelerator is generally used in amounts ranging from 0.5 to 3.5 phb and a secondary accelerator is used in amounts ranging from about 0.1 to 1.5 phb. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The sulfur-cured ternary polymer blends may be used to form a tread rubber which can then be applied in the building of a green tire in which the uncured, shaped tread is built unto the carcass following which the green tire is shaped and cured. Alternatively, the tread can be applied to a cured tire carcass from which the previously tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE

Rubber compositions containing the materials set out in Table I were prepared in a BR Banbury using three separate stages of addition. Table II sets out the cure behavior and vulcanizate properties for the control compound A and also compounds B and C which contain the ternary blend. All parts are parts by weight.

TABLE I

|  | A | B | C |
|---|---|---|---|
| 1st Non-Productive |  |  |  |
| Cis-1,4-polyisoprene[1] | 100 | 90 | 80 |
| Epoxidized NR[2] | 0 | 5 | 10 |
| Carbon Black | 35 | 35 | 35 |
| Processing Oil | 5 | 5 | 5 |
| Fatty Acid | 2 | 2 | 2 |
| Antioxidant | 2 | 2 | 2 |
| Zinc oxide | 5 | 5 | 5 |
| 2nd Non-Productive |  |  |  |
| Carbon Black | 15 | 15 | 15 |
| Chlorosulfonated polyethylene[3] | 0 | 5 | 10 |
| Productive |  |  |  |
| Sulfur | 1.4 | 1.4 | 1.4 |
| N-tert-butyl-2-benzothiazolesulfenamide | 1.0 | 1.0 | 1.0 |

[1]NAT ™ 2200 from The Goodyear Tire & Rubber Company
[2]ENR-25 (epoxidized natural rubber, 25 percent modification) from Guthrie in Malaysia
[3]Hypalon 40 ™ from E I DuPont, Mooney (ML/4@100° C. = 56), chlorine content = 34.5%, sulfur content = 1.0%.

TABLE II

|  | A | B | C |
|---|---|---|---|
| Cis-1,4-polyisoprene | 100 | 90 | 80 |
| Epoxidized NR | 0 | 5 | 10 |
| Chlorosulfonated PE | 0 | 5 | 10 |
| Rheometer, 150° C. |  |  |  |
| Max Torque | 39.2 | 42.0 | 45.6 |
| Min Torque | 8.9 | 11.3 | 14.2 |
| Δ Torque | 30.3 | 30.7 | 31.4 |
| $T_{90}$, (min) | 14.5 | 17.5 | 20.0 |
| Stress-Strain |  |  |  |
| Tensile Strength, (MPa) | 21.2 | 20.2 | 18.5 |
| Elongation at Break, (%) | 534 | 502 | 437 |

TABLE II-continued

|  | A | B | C |
|---|---|---|---|
| $M_{100}$, (MPa) | 2.27 | 2.94 | 3.72 |
| $M_{300}$, (MPa) | 11.13 | 11.78 | 13.14 |
| Hardness |  |  |  |
| RT | 63.4 | 70.4 | 73.2 |
| 100° C. | 58.7 | 61.2 | 63.0 |
| Rebound |  |  |  |
| RT (%) | 46.9 | 38.0 | 33.5 |
| 100° C. (%) | 62.9 | 56.9 | 55.3 |
| Strebler to Self, (N)[1] | 131 | 145 | 118 |
| E' at 60° C., (MPa) | 18.8 | 28.3 | 23.7 |
| Tan Δ at 60° C. | .088 | .104 | .106 |
| DIN Abrasion[2] (% of standard) | 110 | 103 | 114 |

[1]Peel adhesion test which measures tear strength.
[2]Lower values indicate better abrasion resistance.

At the five-part level of epoxidized natural rubber and chlorosulfonated polyethylene (Compound B), one achieves higher stress-strain modulus, hardness and elastic modulus as well as better tear strength (strebler to self) and abrasion resistance as compared to the control, Compound A. The unexpected results are the higher modulus or stiffness properties without a sharp reduction of tear strength but instead a moderate increase as well as improved abrasion resistance. At the 10-part level (Compound C), one still achieves the higher modulus and stiffness properties compared to the Control Compound A but also obtains somewhat lower tear strength and slightly worse abrasion resistance. These results clearly show the unique behavior of using epoxidized natural rubber and chlorosulfonated polyethylene in a range of 5 to 10 parts of each combined with 90 to 80 parts of cis-1,4-polyisoprene. The properties for these compositions closely establish their potential for use in tire tread applications. The abrasion and tear strength improvements are obvious advantages for tread applications whereas the enhancement of stiffness would improve handling characteristics of tires containing the compositions of this invention.

What is claimed is:

1. A ternary polymer blend comprising, based on 100 parts by weight of ternary polymer blend an intimate mixture of
   (a) 76 to 94 parts by weight of polyisoprene having up to 15 percent trans-1,4 structure;
   (b) 3 to 12 parts by weight of a chlorosulfonated polyethylene having (1) a chlorine content of 25 to 50 percent, (2) a sulfur content of 0.7 to 3 percent and (3) a raw polymer viscosity of 30 to 66 (ML-4 at 212° F.); and
   (c) 3 to 12 parts by, weight of epoxidized natural rubber having an epoxidized modification in a range of from 20 to 50 mole percent.

2. The ternary polymer blend of claim 1 wherein the epoxidized natural rubber has a level of epoxidized modification of 25 mole percent.

3. The ternary polymer blend of claim 1 wherein said sulfur content ranges from 1.0 to 1.5 percent.

4. The ternary polymer blend of claim 1 wherein said chlorosulfonated polyethylene has a specific gravity of from 1.11 to 1.28.

5. The ternary polymer blend of claim 1 wherein from 80 to 90 parts by weight of polyisoprene is present.

6. The ternary polymer blend of claim 1 wherein from 5 to 10 parts by weight of a chlorosulfonated polyethylene is present.

7. The ternary polymer blend of claim 1 wherein from 5 to 10 parts by weight of an epoxidized natural rubber is present.

8. A pneumatic tire having an outer circumferential tread wherein said tread comprises, based on 100 parts by weight of a ternary polymer blend, an intimate mixture of
   (a) 76 to 94 parts by weight of polyisoprene having up to 15 percent trans-1,4 structure;
   (b) 3 to 12 parts by weight of chlorosulfonated polyethylene having (1) a chlorine content of 25 to 50 percent, (2) a sulfur content of 0.7 to 3 percent and (3) a raw polymer viscosity of 30 to 66 (ML-4 at 212° F.); and
   (c) 3 to 12 parts by weight of epoxidized natural rubber having an epoxidized modification in a range of from 20 to 50 mole percent.

9. The pneumatic tire of claim 8 wherein from 80 to 90 parts by weight of polyisoprene is present.

10. The pneumatic tire of claim 8 wherein from 5 to 10 parts by weight of chlorosulfonated polyethylene is present.

11. The pneumatic tire of claim 8 wherein from 5 to 10 parts by weight of epoxidized natural rubber is present.

* * * * *